(12) United States Patent
Chan

(10) Patent No.: US 6,223,002 B1
(45) Date of Patent: *Apr. 24, 2001

(54) FILM PRE-EXPOSURE MECHANISM AND METHOD

(76) Inventor: Priscilla Ti Ti Chan, 12/F Union Yip Factory Building, 20 Hing Yip St., Kwun Tong, Kowloon (HK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,607

(22) Filed: Jun. 5, 1998

(51) Int. Cl.$^7$ .............................. G03B 41/00; G03B 17/24
(52) U.S. Cl. .............................. 396/322; 355/20; 355/40; 347/230
(58) Field of Search .................................. 396/310, 315, 396/322, 323, 335, 419, 661; 355/20, 29, 71, 72, 74, 77, 40, 41, 32; 347/226, 230, 232

(56) References Cited

U.S. PATENT DOCUMENTS 4,536,848 * 8/1985 D'Entremont et al. ............ 355/20 X
5,307,108 * 4/1994 Yamanouchi et al. ............... 396/661

FOREIGN PATENT DOCUMENTS 0692738A 1/1996 (EP).
0766128A 4/1997 (EP).

* cited by examiner

Primary Examiner—Alan A. Mathews
(74) Attorney, Agent, or Firm—Samuels, Gauthier & Stevens

(57) ABSTRACT

A mechanism for and a method of pre-exposing a camera film with images. The mechanism comprises a control unit having a storage device for storing said images, a light generator controlled by the control unit to produce a scanning light beam for pre-exposing the film with said images, and a lens aligned with the tube for focusing the light beam onto the film for said image pre-exposure. The mechanism is arranged to be used at least partially in an absolute dark environment. The method resides in the operation of this mechanism.

16 Claims, 3 Drawing Sheets

FILM PRE-EXPOSURE MECHANISM AND METHOD

The present invention relates to a mechanism for and a method of pre-exposing camera film with decorative and/or message images.

BACKGROUND OF THE INVENTION

Cameras designed to use a roll of negative film which is pre-exposed with images such as greeting messages and decorative borders on respective normal exposure frames, are known. Conventionally, the pre-exposure of such images is carried out by using hard copies of the images taken on, for example, positive films. This pre-exposure method is found to be inflexible in terms of the combination and/or order of the images to be pre-exposed on the film rolls.

The invention seeks to mitigate and/or at least alleviate such problems by providing a new mechanism for and a new method of pre-exposing camera film with images.

SUMMARY OF THE INVENTION

According to the invention, there is provided a mechanism for pre-exposing a camera film with images, which mechanism comprises a control unit having a storage device for storing said images, a light generator controlled by the control unit to produce a scanning light beam for pre-exposing the film with the images, and a lens aligned with the tube for focusing the light beam onto the film for the image pre-exposure, the mechanism being arranged to be used at least partially in an absolute dark environment.

Preferably, the mechanism includes a color filter provided between the light generator and the lens for changing the color of the light beam.

More preferably, the filter is provided by a filter wheel which incorporates a plurality of filters of different colors.

It is preferred that the filter wheel is automatically rotatable under the control of the control unit.

In a preferred embodiment, a first support is provided for supporting a film feed spool holding a roll of the film, a second support is provided for supporting a film take-up spool to receive the film fed from the film feed spool, and the light generator and the lens are provided at an intermediate position between the two supports for pre-exposing the film in transit.

It is preferred that the mechanism includes a platform which is provided at the same intermediate position for supporting the film in transit for pre-exposure.

It is preferred that the mechanism includes an enclosure providing the absolute dark environment for housing the light generator and the lens.

More preferably, the enclosure has a central chamber for housing the light generator and the lens and opposite side chambers for housing the respective spools.

Advantageously, the mechanism is adapted to pre-expose a bulk roll of film for subsequently cutting into a plurality of shorter film roll strips for individual use in a camera.

The mechanism preferably includes a sensor arranged to detect a preformed hole of the film for determining the position of the film.

In a preferred embodiment, the light generator is provided by a cathode ray tube.

The invention also provides a method of pre-exposing a camera film with images, which method comprises the steps of providing an absolute dark environment, providing a control unit having a storage device, storing the images in the storage device, providing a light generator to produce a scanning light beam, under the control of the control unit, for pre-exposing the film with said images, and providing a lens aligned with the tube for focusing the light beam onto the film for the image pre-exposure.

Preferably, the method includes the step of providing a color filter between the light generator and the lens for changing the color of the light beam.

It is preferred that the method includes the steps of providing a first support for supporting a film feed spool holding a roll of the film, providing a second support for supporting a film take-up spool to receive the film fed from the film feed spool, and placing the light generator and the lens at an intermediate position between the two supports for pre-exposing the film in transit.

More preferably, the method includes the step of providing a platform at the same intermediate position for supporting the film in transit for pre-exposure.

In a preferred embodiment, the method is adapted to pre-expose a bulk roll of film, and includes the step of subsequently cutting the pre-exposed film into a plurality of shorter film roll strips for individual use in a camera.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
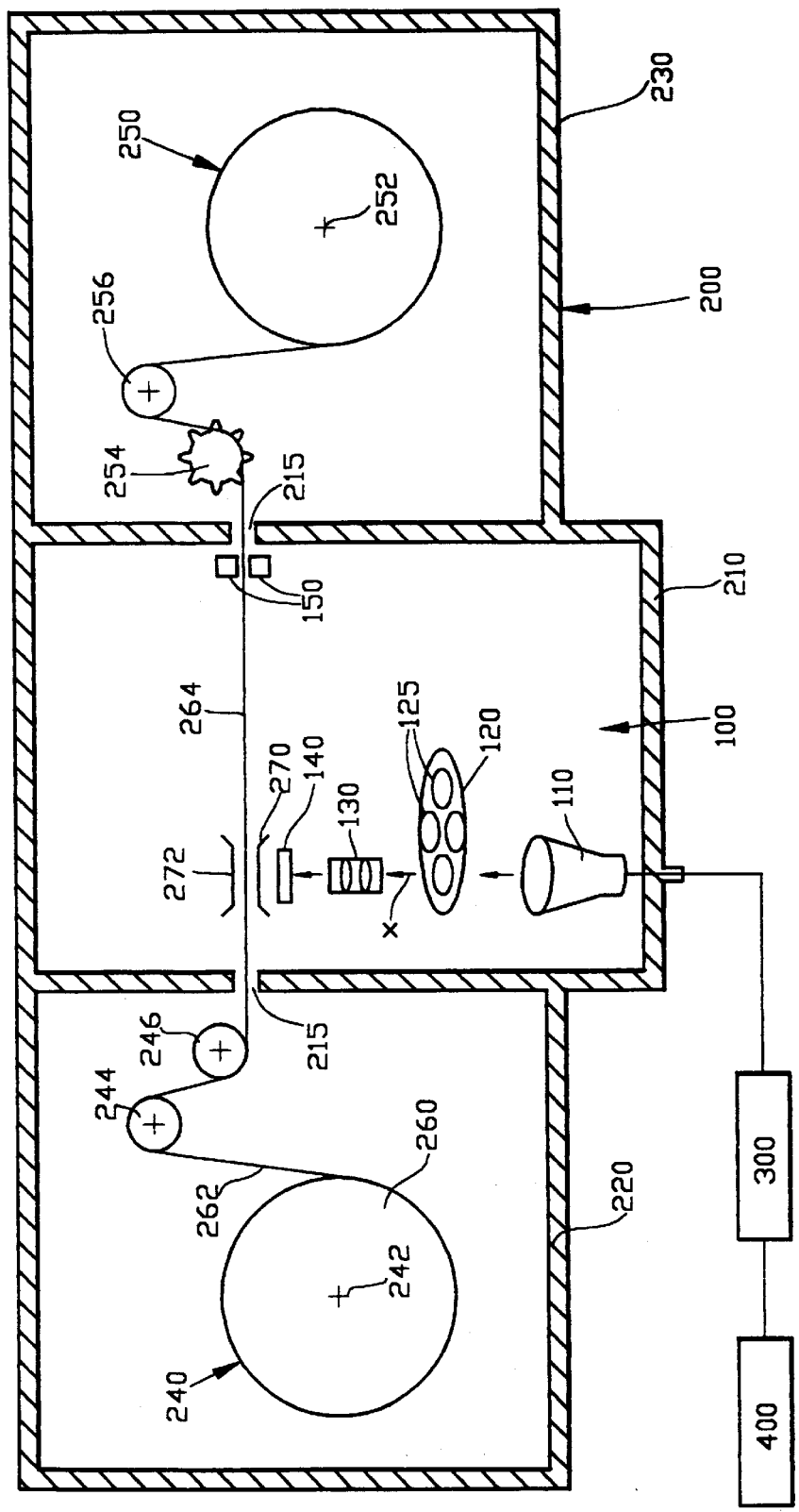
FIG. 1 is a schematic diagram showing an embodiment of a film pre-exposure mechanism in accordance with the invention.

Referring initially to FIG. 1 of the drawings, there is shown a film pre-exposure mechanism 100 embodying the invention, which mechanism 100 is to operate in an absolute dark environment such as one provided by a light-tight enclosure 200 having non-reflective inner wall surfaces. The enclosure 200 may be considered as a part of the overall mechanism 100. It has a central chamber 210 in which the mechanism 100 is installed, and includes left and right chambers 220 and 230. Housed inside the left chamber 220 are a film feed spool 240 rotatable on a first axle 242 and a pair of guide rollers 244 and 246. Housed inside the right chamber 230 are a film take-up spool 250 rotatable on a second axle 252 and a pair of drive sprocket 254 and guide roller 256. The left and right side walls of the central chamber 210 are formed with mutually aligned horizontal slots 215. The feed spool 240 holds a bulk roll 260 of camera film 262 for feeding onto the take-up spool 250 via the guide rollers 244, 246 and 256 and drive sprocket 254. Section 264 of the film 262 in transit extends horizontally across the central chamber 210 through the slots 215 on opposite sides.

The film 262 is preformed with spindle holes (not shown) at regular intervals for defining successive film strips to be pre-exposed by the mechanism 100 with decorative and/or message images and finally cut out from the bulk film roll 260. Each film strip will have a standard length to provide, for example, 24 or 36 normal exposure frames for use as a film roll in a camera.

Inside the central chamber 210, a horizontal platform 270 is provided at an intermediate position to support the film section 264. An apertured pressure plate 272 is used on the platform 270 to hold the film section 264 in position. Also, a light sensor 150 formed by an upper transmitter and a lower receiver is installed adjacent the right hand side slot 215 for detecting the preformed spindle holes of the film section 264 in order to determine the film position and, in particular, the start of the every film strip. Alternatively, the light sensor 150 may be provided on the left hand side of the lens assembly 130. With this arrangement, the film section 264 may need to be advanced for a few more frames to reach the right position.

The mechanism 100 further includes, from below, a light generator such as a cathode ray tube 110 facing upwards, a filter wheel 120, a lens assembly 130 and a shutter 140. The cathode ray tube 110, lens assembly 130 and shutter 140 are aligned to have a common vertical axis X which passes through the center of the platform 270 above. The cathode ray tube 110 serves to generate a narrow beam of light pointing upwards. The filter wheel 120 carries a ring of four filters 125, three of which are red, green and blue in color for changing the color of the light beam and the last one is transparent for protecting the lens assembly 130 when not in use. The lens assembly 130 is used to focus the light beam onto the film section 264 supported on the platform 270.

It is appreciated that any other forms of light generator may be used, such as a laser gun. Also, only the film 262 and the parts of the mechanism 100 through which the light beam passes need to be placed in an absolute dark environment.

The operation of the mechanism 100 is controlled by means of a microprocessor-based control unit such as a computer 300, to which an optical scanner 400 is connected. Hard copies of the images to be pre-exposed onto the film 262 are initially scanned by the scanner 400 into the computer 300 and stored in a suitable computer storage device, such as a hard disk. Alternatively, the images may be computer-generated and stored on the hard disk or a floppy disk.

Figure 2:
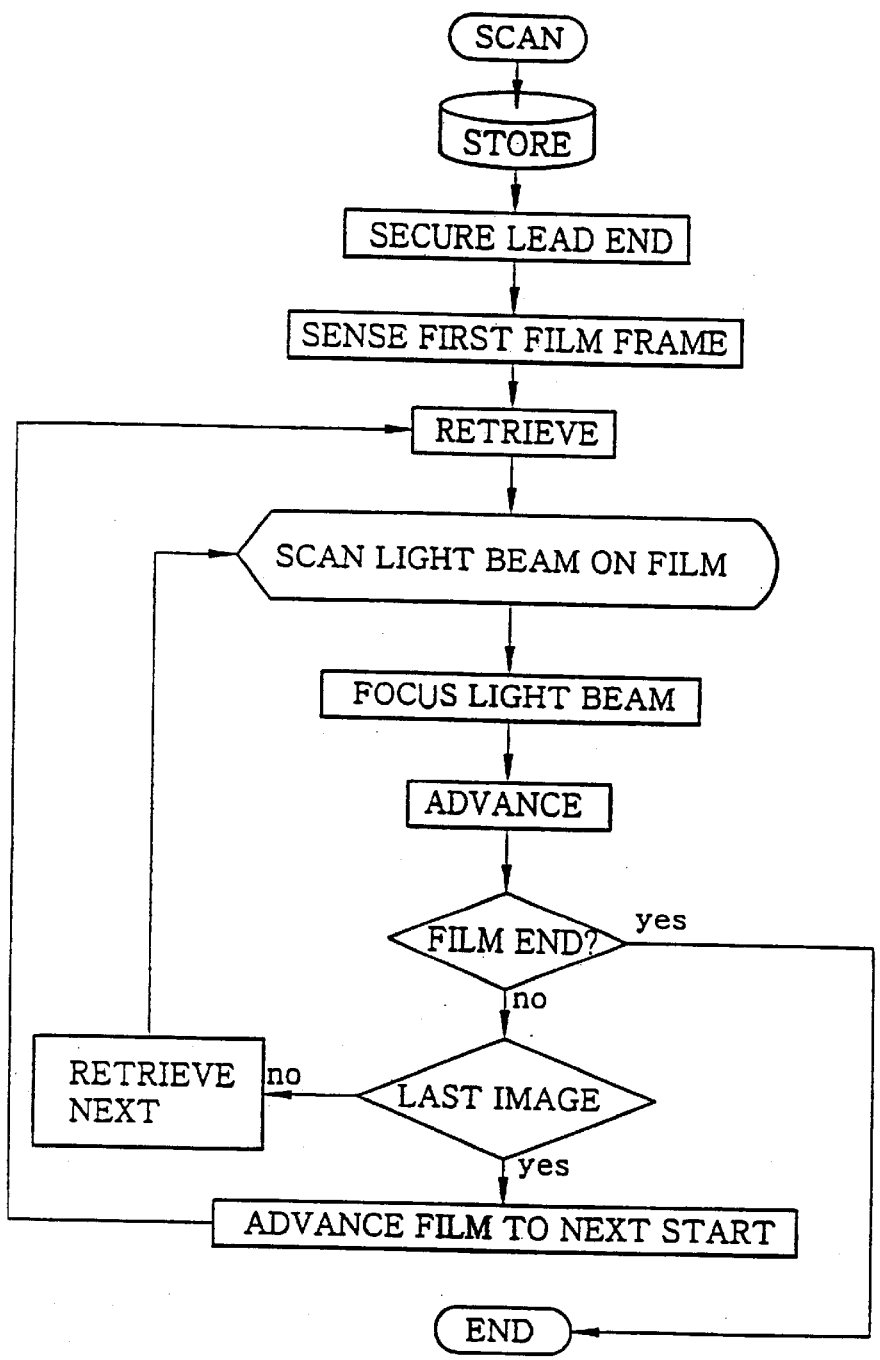
FIG. 2 is a flow chart illustrating a film pre-exposure method, embodying the invention, carried out by the mechanism of FIG. 1.

FIG. 2 illustrates the operation of the mechanism 100 for pre-exposing the film 262, as an example according to the subject invention. Initially, the scanned and/or computer-generated images are stored in the computer 300. After having been loaded onto the feed spool 240 and having the film lead end fed past the guide rollers 244, 246 and 256 and drive sprocket 254 to reach the take-up spool 250, the bulk film roll 260 is advanced until the first preformed spindle hole of the film 262 is detected by the sensor 150. At this time, the first frame of the film 262, which will also be the first exposure frame of the first film roll strip, should align centrally with the axis X on the platform 270. The computer 300 then retrieves the first stored image and displays it on the cathode ray tube 110 in the form of a scanning light beam which results in a travelling spot of light scanning the entire or part of the tube screen depending on the size of the image.

The light beam scans three times through the three color filters 125 in turns, with each of the color filters 125 rotated to position automatically under the control of the computer 300. The lens assembly 130 serves to focus the scanning light beam onto the frame for pre-exposing it with the image. The intensity of the light beam changes according to the image for reproducing it onto the frame.

Due to the nature of negative films, multiple scanning will normally be needed, even for reproducing a mono-chromatic image, in order to obtain the right color.

Upon completion of the first image pre-exposure, the film 262 is advanced for one frame in order to place the next frame centrally on the platform 270. A checking step will now be taken to see whether the bulk film roll 260 has come to an end. If so, the operation will terminate, otherwise another step will be taken to check whether the last image for the current film roll strip has just been processed. In the affirmative, the bulk film roll 260 will be advanced until the next preformed spindle hole is detected by the sensor 150. Subsequently, the computer 300 will retrieve the first stored image for the next film roll strip and the aforesaid procedures will be repeated. If the current film roll strip has not yet been finished, the computer 300 will retrieve the next stored image for the cathode ray tube 110 to scan and the aforesaid procedures will be repeated.

Figure 3:
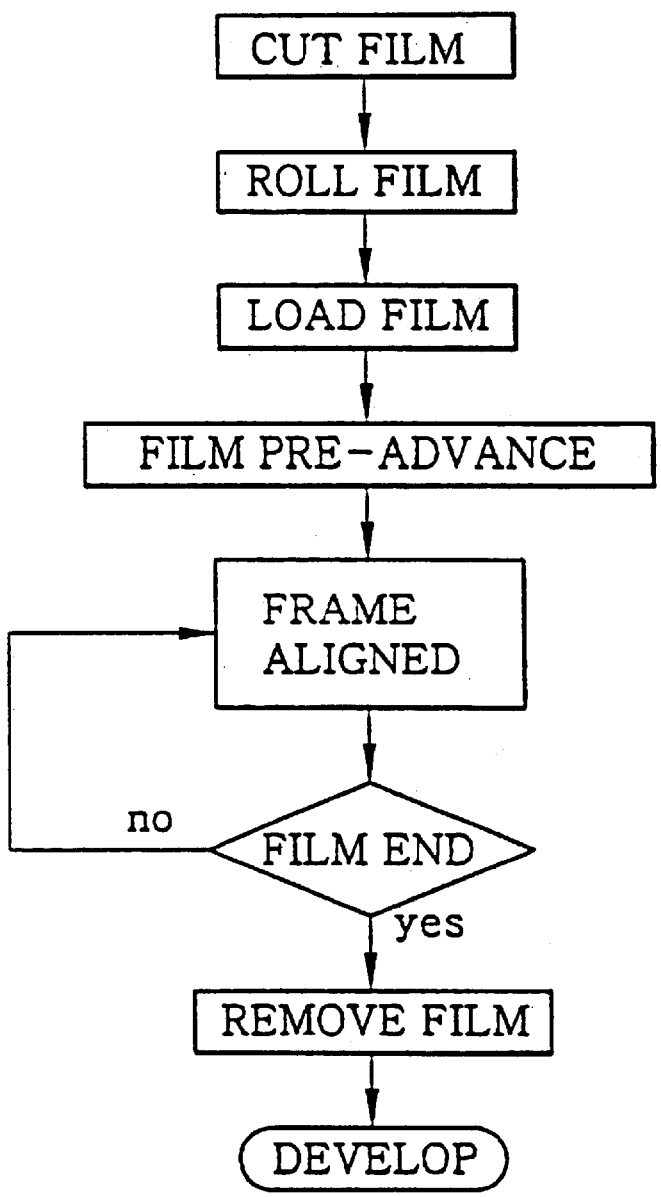
FIG. 3 is a flow chart illustrating the subsequent procedures of using the pre-exposed film produced.

Reference is finally made to FIG. 3, which illustrates the subsequent procedures of using the pre-exposed film 262 produced. Initially, the film 262 is cut into film strips at positions according to the respective preformed spindle holes. Each film strip is then rolled into a standard 35 mm film cartridge to form a film roll for loading into a camera, which may be a single-use or reusable camera. The camera is now ready for use, with a specified frame for a reusable or single-use camera positioned for the first actual photograph to be taken on the same frame and in alignment with the pre-exposed image. The next and subsequent frames are then used one-by-one until all of them are exposed. At the end, the film roll is removed from the camera for film development and print making in the conventional manner.

The use of the aforesaid computer-operated cathode ray tube to produce pre-exposed film is highly flexible, in that a different combination and/or order of the pre-exposure images may be used for each film roll strip as desired. The pre-exposure of a whole bulk film roll in a single operation, rather than the film roll strips individually, will also considerably increase the speed of production.

The invention has been given by way of example only, and various other modifications of and/or alterations to the described embodiment may be made by persons skilled in the art without departing from the scope of the invention as specified in the appended claims.

What is claimed is:

1. An apparatus for pre-exposing a length of camera film with a sequence of images at respective exposure frames, which apparatus comprises a film feed spool for supporting a roll of film and a film take-up spool, in use, the length of film extending between said spools, a control unit having a storage device for storing said images, a light generator controlled by the control unit to produce a scanning light beam for pre-exposing a part of each exposure frame of the film with said images, and a lens aligned with the light generator for focusing the light beam onto the film for said image pre-exposure.

2. The apparatus as claimed in claim 1, including a color filter provided between the light generator and the lens for changing the color of the light beam.

3. The apparatus as claimed in claim 2, wherein the filter is provided by a filter wheel which incorporates a plurality of filters of different colors.

4. The apparatus as claimed in claim 3, wherein the filter wheel is automatically rotatable under the control of the control unit.

5. The apparatus as claimed in claim 1, wherein a first support is provided for supporting the film feed spool holding a roll of the film, a second support is provided for supporting a film take-up spool to receive the film fed from the film feed spool, and wherein the light generator and the lens are provided at an intermediate position between the two supports for pre-exposing the film in transit there between.

6. The apparatus as claimed in claim 5, including a platform which is provided at the same intermediate position for supporting the film in transit for pre-exposure.

7. The apparatus as claimed in claim 5, including an enclosure providing an absolute dark environment for housing the light generator and the lens.

8. The apparatus as claimed in claim 7, wherein the enclosure has a central chamber for housing the light generator and the lens and opposite side chambers for housing the respective spools.

9. The apparatus as claimed in claim 1, being adapted to pre-expose a bulk roll of film for subsequently cutting into a plurality of shorter film roll strips for individual use in a camera.

10. The apparatus as claimed in claim 1, including a sensor arranged to detect a preformed hole of the film for determining the position of the film.

11. The apparatus as claimed in claim 1, wherein the light generator is provided by a cathode ray tube.

12. A method of pre-exposing a length of camera film with a sequence of images at positions corresponding to exposure frames using an apparatus having a control unit having a storage device, a light generator to produce a scanning light beam and a lens aligned with the light generator for focusing the light beam onto the film, the method comprising the steps of storing said images in the storage device, under the control of the control unit retrieving a stored image and utilizing said light generator to pre-expose a part of each exposure frame of the film with said image, and advancing the film and utilizing the light generator to pre-exposure further images in sequence along the length of film.

13. The method as claimed in claim 12, including the step of providing a color filter between the light generator and the lens for changing the color of the light beam.

14. The method as claimed in claim 12, including the steps of providing a first support for supporting a film feed spool holding a roll of the film, providing a second support for supporting a film take-up spool to receive the film fed from the film feed spool, and placing the light generator and the lens at an intermediate position between the two supports for pre-exposing the film in transit.

15. The method as claimed in claim 14, including the step of providing a platform at the same intermediate position for supporting the film in transit for pre-exposure.

16. The method as claimed in claim 12, being adapted to pre-expose a bulk roll of film, and including the step of subsequently cutting the pre-exposed film into a plurality of shorter film roll strips for individual use in a camera.

\* \* \* \* \*